United States Patent [19]
Davis

[11] 4,006,625
[45] Feb. 8, 1977

[54] AMPLITUDE SORTING OF OSCILLATORY BURST SIGNALS BY SAMPLING

[75] Inventor: Thomas J. Davis, Richland, Wash.

[73] Assignee: Battelle Memorial Institute, Columbus, Ohio

[22] Filed: July 30, 1975

[21] Appl. No.: 600,418

[52] U.S. Cl. .................................. 73/71.4; 328/32
[51] Int. Cl.² ........................................ G01H 1/00
[58] Field of Search ............................ 73/88.3, 71.4

[56] References Cited
UNITED STATES PATENTS

| | | | |
|---|---|---|---|
| 3,713,127 | 1/1973 | Keledy et al. | 73/67 |
| 3,784,079 | 1/1974 | Spanjer | 73/71.4 X |
| 3,842,663 | 10/1974 | Harting et al. | 73/67.2 |

*Primary Examiner*—Charles A. Ruehl
*Attorney, Agent, or Firm*—Klarquist, Sparkman, Campbell, Leigh, Hall & Whinston

[57] ABSTRACT

A method and apparatus for amplitude sorting of oscillatory burst signals is described in which the burst signal is detected to produce a burst envelope signal and an intermediate or midportion of such envelope signal is sampled to provide a sample pulse output. The height of the sample pulse is proportional to the amplitude of the envelope signal and to the maximum burst signal amplitude. The sample pulses are fed to a pulse height analyzer for sorting. The present invention is used in an acoustic emission testing system to convert the amplitude of the acoustic emission burst signals into sample pulse heights which are measured by a pulse height analyzer for sorting the pulses in groups according to their height in order to identify the material anomalies in the test material which emit the acoustic signals.

15 Claims, 3 Drawing Figures

AMPLITUDE SORTING OF OSCILLATORY BURST SIGNALS BY SAMPLING

BACKGROUND OF INVENTION

The subject matter of the present invention relates generally to amplitude sorting of oscillatory burst signals by converting such burst signals into output pulses whose height is proportional to the maximum amplitude of the burst signals. More specifically, the invention involves detecting the oscillatory burst signals to provide corresponding burst envelope signals, sampling of the midportion of the envelope to produce an output sample pulse whose height is proportional to the amplitude of the envelope signal and the corresponding maximum amplitude of the burst signal, and transmitting the sample pulses to a pulse height analyzer for sorting.

The method and apparatus of the present invention are especially useful in an acoustic emission testing system for amplitude sorting of the acoustic emission signals in order to identify the flaws or other material anomalies producing such signals in the material being tested. However, the present invention is also useful in amplitude sorting of any oscillatory burst signals where the rise times of the burst signal envelopes vary in an unpredictable manner, because it employs delayed sampling to sample the midportion of such envelopes.

Previous acoustic emission testing apparatus, such as that described by P.H. Hutton in the article, "Acoustic Emission Applied Outside Of The Laboratory", in *Acoustic Emission*, published by the American Society for *Testing and Materials*, special technical bulletin 505, 1972, pages 114–128, do not identify the flaws satisfactorily. Thus, while conventional acoustic emission testing systems have the ability to detect and locate the origin of acoustic signals emitted from the flaws within the test material, they have great difficulty in identifying the types of flaws and distinguishing between insignificant and significant flaws. These problems are overcome by the present invention. The prior testing apparatus does not convert the acoustic emission burst signals into output pulses whose height is proportional to the amplitude of the burst signal envelope so that such output pulses may be transmitted to a pulse height analyzer for amplitude sorting in the manner of the present invention. By sorting and counting the acoustic emission burst signals according to their amplitude, it is possible with the invention to identify the material anomalies, such as porosity, cracks, or other flaws, emitting such acoustic signals in the test material with a much greater degree of accuracy.

The present invention sorts oscillatory burst signals according to their amplitude by detecting such signals to produce a corresponding burst envelope signal and sampling an intermediate portion of such envelope signal occurring after its leading edge has risen completely, to produce a sample output pulse whose height is proportional to the amplitude of the envelope signal and the corresponding maximum amplitude portion of the oscillatory burst signal. These sample output pulses are then fed to a pulse height analyzer for counting and sorting according to their pulse height, into groups of pulses, which groups correspond to certain material anomalies or flaws.

It is known to sample the midportion of a signal by delayed triggering of a sampling pulse generator, as shown in U.S. Pat. No. 3,470,482 of G. R. Kolnowski, grated Sept. 30, 1969. However, there is no teaching in this patent of producing an envelope signal of an oscillatory burst signal and sampling such envelope signal to produce sample pulses of corresponding height which enable amplitude sorting of such burst signals in the manner of the present invention. In addition, this prior sampling apparatus has the disadvantage that the sampling pulse generator can be prematurely triggered by reflections or other transient signals in the input signal. This is avoided in the present circuit by providing a lockout multivibrator which prevents retriggering of the sampling pulse generator for a predetermined adjustable time. Thus, signal reflections of a given oscillatory burst signal in the acoustic emission test material are prevented from retriggering the sampling pulse generator.

SUMMARY OF INVENTION

It is therefore one object of the present invention to provide a method and apparatus for converting the amplitude of an oscillatory burst signal into a pulse height proportional to such amplitude.

A further object of the invention is to provide such a method and apparatus in which the oscillatory burst signal is detected to produce a burst envelope signal whose midportion is sampled to provide a sample pulse whose height is proportional to the amplitude of such envelope signal and the corresponding maximum amplitude of such burst signal.

Another object of the invention is to provide an acoustic emission testing system employing such a burst amplitude to pulse height conversion method and apparatus for converting acoustic emission burst signals into output pulses whose height is proportional to the amplitude of the burst signals and for transmitting such output pulses to a pulse height analyzer to enable amplitude sorting of such burst signals.

A still further object of the present invention is to provide such an acoustic emission testing system which is capable of determining the type of flaw or material anomaly in the test material from which the acoustic burst signals are emitted.

An additional object of the invention is to provide a method and apparatus for amplitude sorting of oscillatory burst signals in which the burst envelope signal is sampled at an intermediate portion of such envelope signal after a predetermined time delay with respect to the start of such envelope signal.

Still another object of the invention is to provide such an apparatus in which a lockout signal is produced to delay sampling for a predetermined time after the previous sample to prevent reflections of the burst signal from triggering the sampling pulse generator and causing spurious sampling.

BRIEF DESCRIPTION OF DRAWINGS

Other objects and advantages of the present invention will be apparent from the following detailed description of a preferred embodiment thereof and from the attached drawings, of which.

DESCRIPTION OF PREFERRED EMBODIMENT

Figure 1:
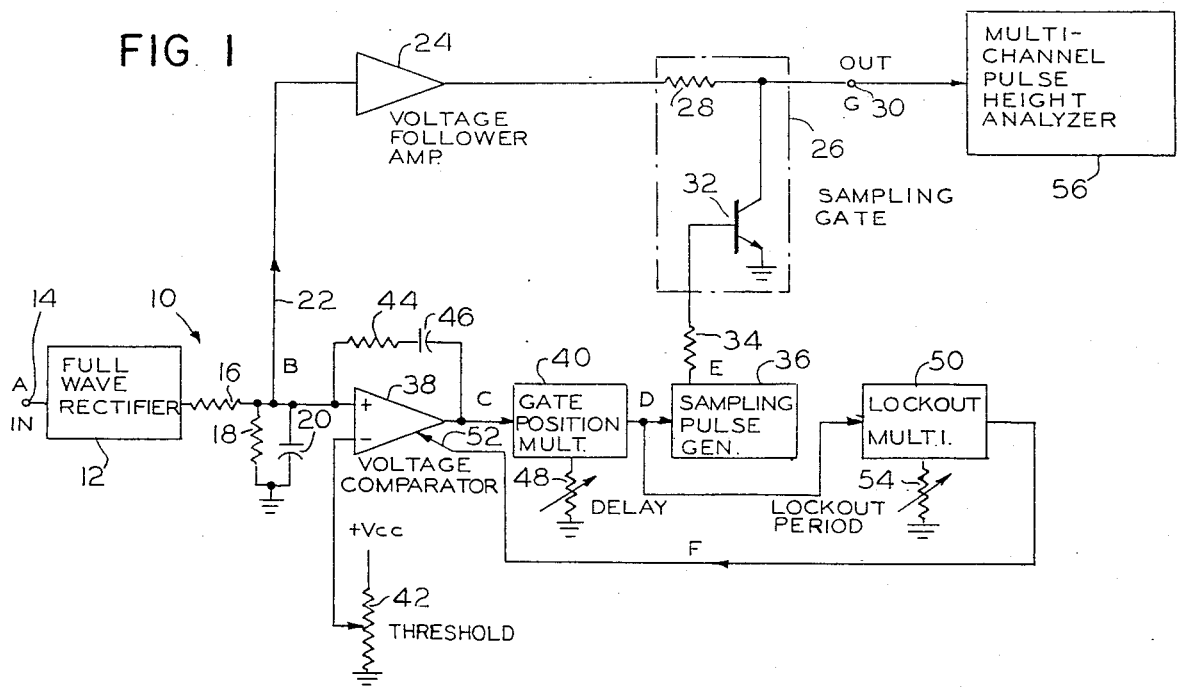
FIG. 1 is a schematic diagram of the electrical sampling circuit for converting oscillatory burst signals into sample output pulses whose heights are proportional to the amplitudes of such burst signals, to enable amplitude sorting of the burst signals.

As shown in FIG. 1, the circuit of the present invention includes a detector means 10 comprising a full-wave bridge rectifier 12 having its input connected to an input terminal 14 to which the oscillatory burst signal A of FIG. 2A is applied. The output of rectifier 12 is connected to a filter including a series coupling resistor 16, a shunt resistor 18 connected between the output terminal of such coupling resistor and ground, and a bypass capacitor 20 connected in parallel with such shunt resistor. The values of the resistors 16 and 18 and capacitor 20 vary depending on the frequency of the oscillatory burst signal and are selected to produce the burst envelope signal B of FIG. 2B at the output of the filter which is connected to an output conductor 22.

The burst envelope signal B has an amplitude whose instantaneous value corresponds to the maximum amplitudes of successive cycles of the burst signal A. The burst signal may be approximately 100 milliseconds long and have a frequency of about 1 megahertz for a typical acoustic emission burst signal. Thus, while the burst frequency may be up to 20 megahertz, the high frequency response of the acoustic emission testing apparatus is limited to only about 0.1 to 2 megahertz.

The burst envelope signal B is transmitted through conductor 22 to voltage follower amplifier 24, whose output is connected to the input of a sampling gate 26. The sampling gate includes a series coupling resistor 28 connected between the output of the amplifier 24 and the output terminal 30 of the sampling gate, and an NPN type switching transistor 32 whose emitter is grounded and collector is connected to the output end of resistor 28. The base of the sampling transistor 32 is connected through a coupling resistor 34 to the output of a sampling gate pulse generator 36. The sampling transistor 32 is normally biased conducting so that it shorts the output terminal 30 and transmits the amplifier burst envelope signal to ground.

When the sampling gate pulse generator 36 produces the sampling gate pulse E of FIG. 2E, it momentarily renders the sampling transistor 32 nonconducting and thereby causes a sample portion of the envelope signal B to be transmitted to the output terminal 30 as a sample output pulse G of FIG. 2G. The height $X_2$ of the sample output pulse is proportional to the amplitude $X_1$ of the sampled midportion of the envelope signal B, which in turn is proportional to the maximum amplitude of the burst signal A. It should be noted that the sampling pulse E is shown as a positive pulse whereas actually it must be inverted so that a negative sampling pulse is applied to the base of transistor 32 to render it nonconducting and cause sampling.

The timing of the triggering of the sampling pulse generator 36 with respect to the beginning of the burst envelope signal is controlled by a voltage comparator 38. The comparator has its positive input connected to the output conductor 22 of the envelope detector 10. A monostable gate position multivibrator 40 is connected between the output of the comparator 38 and the input of the sampling pulse generator 36. The negative input of the comparator 38 is connected to the movable contact of a threshold voltage potentiometer 42 having one end terminal grounded and its other end terminal connected to a source of positive D.C. supply voltage. Thus, the setting of the movable contact of potentiometer 42 determines the value of a D.C. threshold voltage applied to the negative input of comparator 38. When the burst envelope signal exceeds this threshold voltage, the rectangular comparator output signal C is initiated because such comparator switches rapidly to a high voltage state, due to the positive feedback of a feedback resistor 44 connected in series with a feedback capacitor 46 between the output of the comparator and its positive input.

The comparator output signal is applied to the input of the gate position multivibrator 40 to trigger such multivibrator and cause it to produce a rectangular gate position output signal D of FIG. 2D. The negative going trailing edge of the gate position signal triggers the sampling gate pulse generator 36 and causes it to produce the sampling pulse E. Thus, the width of the gate position signal D provides a time delay in the generation of the sampling pulse E with respect to the start of the burst envelope signal B. This time delay is adjustable by means of a variable resistance 48 connected to the gate position multivibrator 40.

As a result of this time delay, the sampling pulse E is produced during an intermediate portion of the burst envelope signal B after such envelope signal has reached its maximum amplitude. As a result, the sample output pulse G has a pulse height $X_2$ which is proportional to the amplitude $X_1$ of the burst envelope signal and the corresponding maximum amplitude of the oscillatory burst signal. It should be noted that the sampling pulse E and the corresponding sample output G both have a very narrow pulse width on the order of 5 microseconds or less, which is much less than the width of one cycle of the oscillatory burst signal.

In some cases, such as when used in acoustic emission testing, the oscillatory burst signal is followed by spurious signals caused by reflections of the primary acoustic signal within the test material. These signal reflections can cause spurious triggering of the sampling pulse generator to give a false output at output terminal 30. In order to avoid this problem, a monostable lockout multivibrator 50 is connected between the output of the gate position multivibrator 40 and an enabling input 52 of the voltage comparator 38. As shown in FIG. 2F, the lockout multivibrator produces a lockout signal F when it is triggered by the leading edge of the gate position signal D. The duration of the lockout signal is adjusted by a variable resistance 54 connected to the monostable multivibrator 50 which controls the recovery time of such multivibrator after triggering. The voltage comparator 38 is disabled from producing an output by the lockout signal F until after the signal reflections or other spurious signals have terminated. Thus, if it were not for the lockout signal of FIG. 2F, the comparator could be switched again at any time after it returns to its quiescent voltage state at the termination of a comparator output signal when the envelope signal falls down below the threshold reference voltage level. Thus, the lockout signal disables the comparator during a disabling period between the termination of comparator output C and the termination of lockout signal F, and thereby prevents false triggering of the sampling pulse generator during this time.

The sample output pulses at output terminal 30 are sorted according to their height by transmitting such output pulses to the input of a multiple channel pulse height analyzer 56 of conventional type, such as that disclosed in Chapter 3 of the book, *Basic Nuclear Electronics*, by H. H. Chiang, published in 1969 by John Wiley & Sons.

Figure 2:
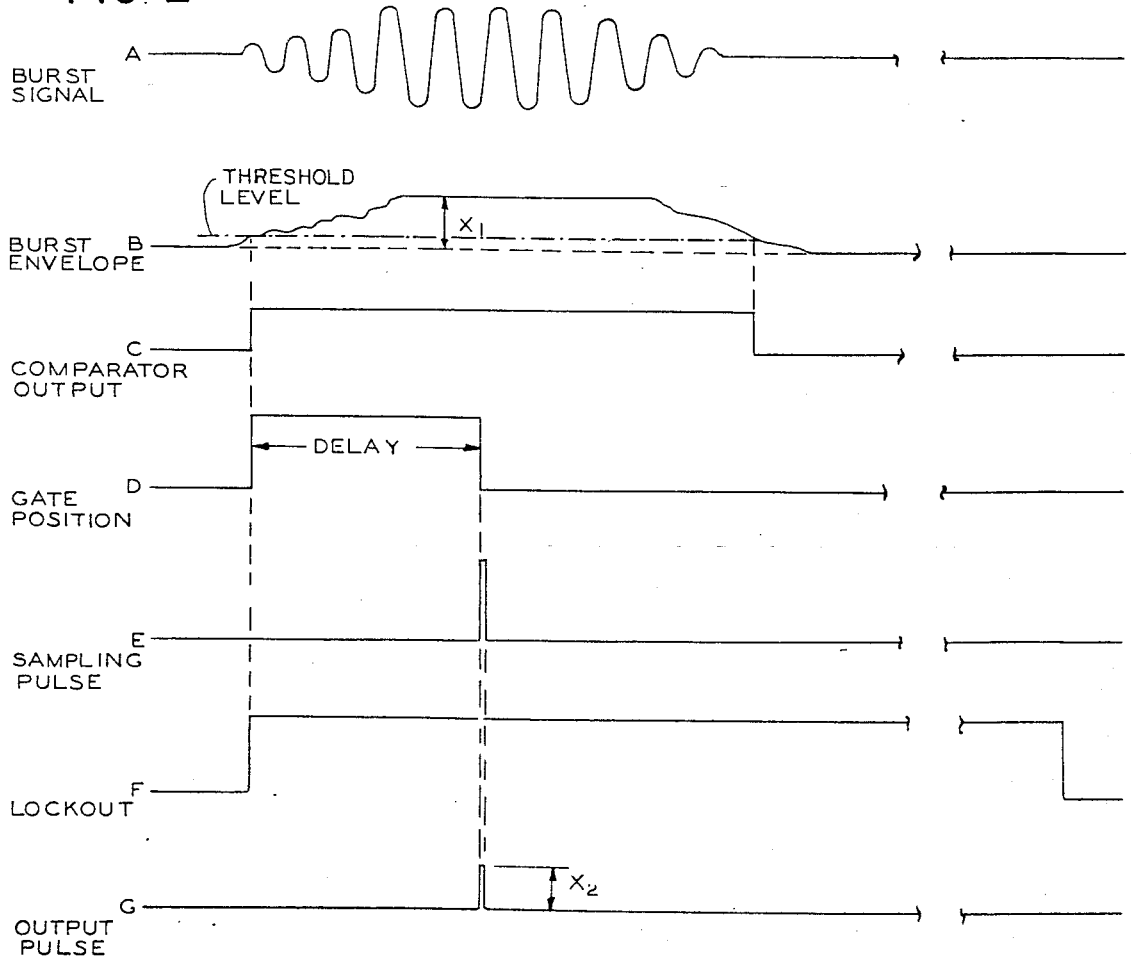
FIG. 2 is a diagram of the waveforms of electrical signals produced in the circuit of FIG. 1, shown on the same time scale.
Figure 3:
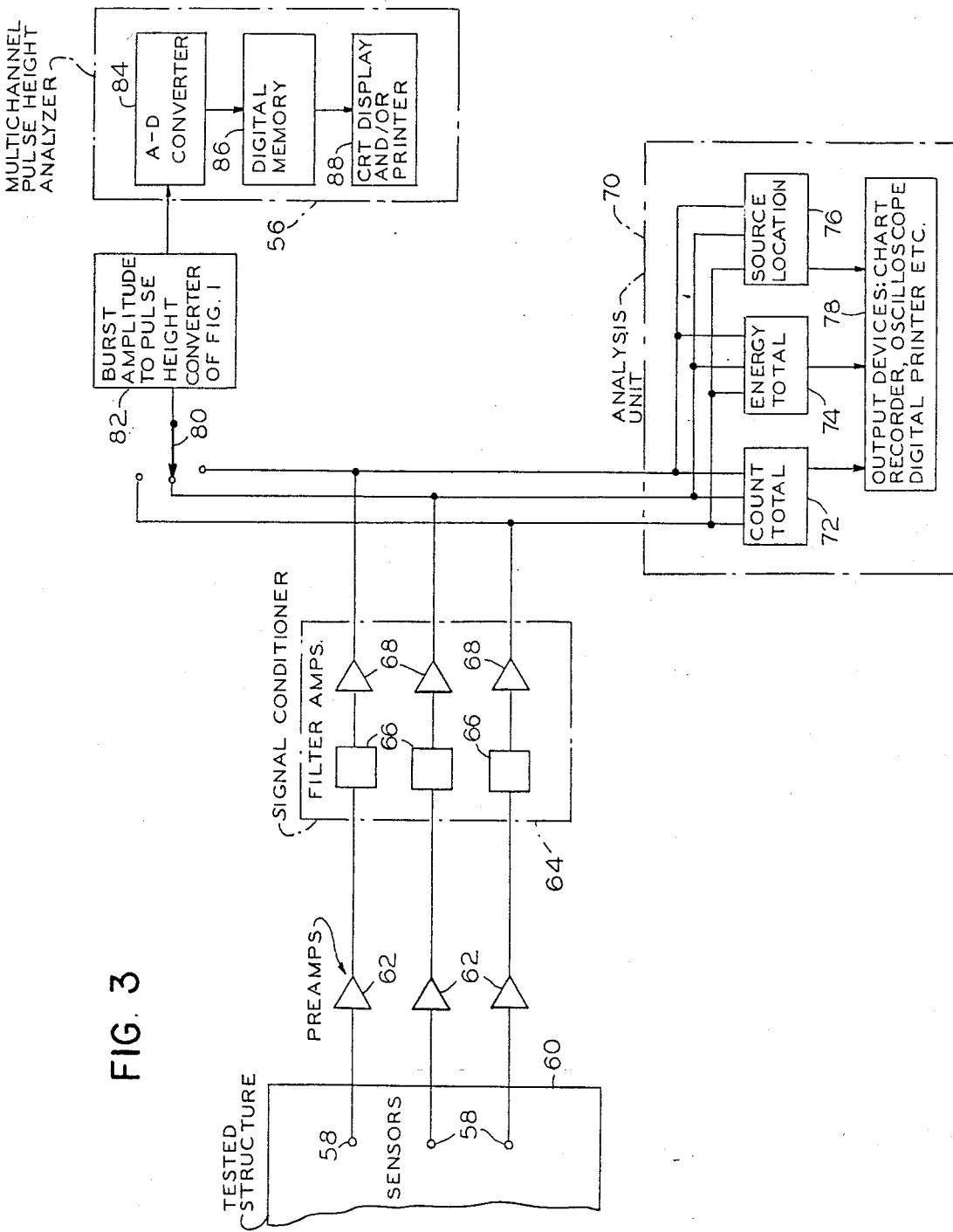
FIG. 3 is a schematic diagram of an acoustic emission testing system using the sampling circuit of FIG. 1 for amplitude sorting of the acoustic emission burst signals.

FIG. 3 shows an acoustic emission testing system using the apparatus and method for amplitude sorting of oscillatory burst signals of FIGS. 1 and 2. The acoustic emission testing system includes a plurality of sensors 58, such as piezoelectric transducers, which are positioned at spaced locations along the structure or material under test 60. When the test material is stress loaded, such as by bending, or is melted and then allowed to cool, such as during welding, material anomalies or flaws grow and emit acoustic waves in the test material. These acoustic waves are transmitted to the sensors 58 and converted by the piezoelectric transducers into electrical signals which are oscillatory burst signals of the general waveform type shown in FIG. 2A. These acoustic emission burst signals are transmitted through preamplifiers 62 to signal conditioning means 64. The signal conditioning means 64 includes a plurality of pairs of high-pass filters 66 and amplifiers 68, each pair being connected in series to the output one of the preamplifiers 62.

As shown in FIG. 3, three sensors 58 and associated preamplifiers 62 are connected in series with signal conditioning filters 66, and power amplifiers 68 to form three separate channels which transmit the acoustic emission burst signals to an acoustic emission signal analysis unit 70 of conventional type, such as that discussed in the article by P.H. Hutton, referred to previously. Thus, the analysis unit contains a counting circuit 72 for counting the number of acoustic emission burst signals received in each channel, an energy measurement circuit 74 for measuring the amount of energy of each burst signal, and a source location circuit 76 for locating the position of the flaw which is the source of the burst signals in the material under test 60. The location of the flaw or other material anomaly is done by means of a digital computer in the source location circuit 76 in a conventional manner by triangulation, as described by P. H. Hutton, since the burst signals produced by the three transducers 58 are generated at different times depending upon the distance of the flaw from such transducers. This time information is used by the computer to located the flaw or other source of the acoustic emission.

The outputs of the count circuit 72, the energy measurement circuit 74, and the source location circuit 76 are transmitted to any of a plurality of different output devices 78 including a chart recorder, a cathode ray oscilloscope, or a digital printer.

The outputs of the amplifiers 68 of the three different channels are also selectively applied by means of a switch 80 to the input of the sampling circuit 82 of FIG. 1. The sampling circuit 82 converts the oscillatory burst signals A into sample output pulses G whose height is proportional to the amplitude of the burst envelope signal B, as discussed previously with respect to FIGS. 1 and 2. The sample output pulses of the sampling circuit 82 are transmitted to the multi-channel pulse height analyzer 56 for sorting according to their height. As stated previously in connection with FIG. 2, each of the acoustic emission waves emitted by the flaw causes wave reflections to be produced in the test material which are also received by the sensors 58 to produce corresponding reflection signals. The sampling circuit of FIG. 1 samples only the primary acoustic emission signal and not the signal reflections because of the operation of the lockout multivibrator 50.

The pulse height analyzer 56 is of a conventional type, such as those discussed by H. H. Chiang in the abovementioned book, and may include an analog to digital converter 84 whose input is connected to the output of the sampling circuit 82 and whose output is connected to the input of a digital memory 86. The output of the memory is connected to a cathode ray tube display device or to a digital printer 88. The pulse height analyzer sorts the sample output pulses into groups according to their height and counts the number of sample output pulses in each group to determine the nature of the flaw or other material anomaly producing the acoustic emission burst signals corresponding to such sample pulses. Different types of flaws have different characteristics, which can be distinguished by the pulse height analyzer. For example, crack growth in test material is generally characterized by a small number of large amplitude acoustic emission burst signals, while porosity formation in such test material usually produces a large number of small amplitude acoustic emission burst signals. Thus, by amplitude sorting of the oscillatory burst signals in the manner of the present invention, the flaws and other material anomalies can be identified.

It will be obvious to those having ordinary skill in the art that many changes may be made in the details of the preferred embodiment without departing from the invention. For example, the sampling gate transistor 32 can be replaced by a normally nonconducting diode bridge sampling gate connected in series between resistor 28 and output terminal 30, which is rendered conducting by the sampling pulse. Therefore the scope of the present invention should only be determined by the following claims.

I claim:

1. Apparatus for converting the amplitudes of oscillatory burst signals into pulse heights comprising:
    input means for supplying oscillatory burst electrical signals which each include a plurality of cycles of different amplitudes;
    envelope detector means for detecting said oscillatory burst signals and producing an envelope signal corresponding to the envelope of the detected oscillatory burst signal, said envelope having a peak amplitude which occurs after several successive cycles of the burst signal corresponding thereto; and
    sampling means for sampling an intermediate portion of said envelope signal to produce a sample pulse output of less width than the envelope signal and whose pulse height corresponds to the peak amplitude of the detected oscillatory burst signal, said sampling means producing sample pulses of different heights corresponding to burst signals of different peak amplitudes.

2. Apparatus according to claim 1 which also includes sorting means for receiving the sample pulses of a plurality of successive envelope signals and sorting said sample pulses according to height.

3. Apparatus according to claim 2 in which the sorting means is a pulse height analyzer.

4. Apparatus according to claim 1 in which the oscillatory burst signal increases in amplitude for several successive cycles at the beginning of said burst signal to produce a gradually rising leading edge of the envelope signal, and the sampling means includes a sampling pulse generator which is triggered at a predetermined time delay after the start of the envelope signal to cause said sampling to occur after said leading edge has risen to its maximum amplitude.

5. Apparatus according to claim 4 in which the sampling means includes comparator means for comparing the envelope signal with a reference signal to switch and thereby produce a comparator output pulse which triggers a gate position signal generator to produce a gate position signal when the envelope signal exceeds said reference signal, such gate position signal triggering the sampling pulse generator when it terminates.

6. Apparatus in accordance with claim 5 which includes a lockout signal generator which is triggered by the start of the gate position signal to produce a lockout signal that terminates a predetermined time after the comparator reverts to its quiescent state, said lockout signal being applied to the comparator means to prevent it from producing another comparator output pulse during said lockout signal.

7. Apparatus in accordance with claim 5 in which the gate position generator is a monostable multivibrator including means for adjusting the recovery time of said multivibrator to adjust the width of the gate position signal to change the time delay before triggering of the sampling gate pulse generator.

8. Apparatus in accordance with claim 1 in which the envelope detector means includes a full wave rectifier and a smoothing filter.

9. Apparatus in accordance with claim 1 in which the sampling means includes a normally conducting switch connected between a sample pulse output terminal and ground, said switch being rendered nonconducting by said sampling means to produce a sample pulse output.

10. An acoustic emission testing system including the apparatus of claim 1 in which the input means is ultrasonic transducer means for generating the oscillatory burst signals in response to the receipt of acoustic emission signals produced in a test material.

11. Apparatus in accordance with claim 10 which includes a plurality of separate channels each connected to the output of one of a plurality of different acoustic emission transducers, and means for connecting said channels to said sampling means, and for transmitting the sample pulse outputs to a pulse height analyzer means.

12. A method of acoustic emission testing of materials for different material anomalies, comprising:
sensing acoustic emission waves emitted by flaws and other anomalies in said materials, and converting said waves into oscillatory burst electrical signals;
detecting said oscillatory burst signals to produce an envelope signal corresponding to the envelope of the detected burst signal;
sampling an intermediate portion of said envelope signal to produce a sample pulse output whose pulse height corresponds to the peak amplitude of the detected burst signal; and
sorting the sample pulses of a plurality of successive envelope signals into different groups according to their pulse heights, certain of said groups corresponding to a different type of material anomaly.

13. A method in accordance with claim 12 which also includes counting the number of sample pulses in each of said groups.

14. A method in accordance with claim 12 which also includes converting the sample pulses from analog to digital signals before sorting.

15. A method in accordance with claim 12 in which the sensing of the acoustic emission waves is done at a plurality of different locations on the material to produce a corresponding plurality of oscillatory burst signals for each anomaly, and also includes measuring the relative times of generation of said plurality of burst signals to determine the location of said anomaly.

* * * * *

UNITED STATES PATENT OFFICE
CERTIFICATE OF CORRECTION

PATENT NO. : 4,006,625
DATED : February 8, 1977
INVENTOR(S) : THOMAS J. DAVIS

It is certified that error appears in the above-identified patent and that said Letters Patent are hereby corrected as shown below:

Column 3, lines 42-43, "amplifier" should be --amplified--.

Signed and Sealed this

Seventeenth Day of May 1977

[SEAL]

Attest:

RUTH C. MASON
Attesting Officer

C. MARSHALL DANN
Commissioner of Patents and Trademarks